US009971793B2

(12) United States Patent
Tsuchida et al.

(10) Patent No.: US 9,971,793 B2
(45) Date of Patent: May 15, 2018

(54) DATABASE MANAGEMENT SYSTEM AND DATABASE MANAGEMENT METHOD

(71) Applicant: HITACHI, LTD., Tokyo (JP)

(72) Inventors: Takayuki Tsuchida, Tokyo (JP); Akira Shimizu, Tokyo (JP); Shinji Fujiwara, Tokyo (JP); Wataru Kawai, Tokyo (JP); Shinsuke Hamada, Tokyo (JP); Yuki Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 335 days.

(21) Appl. No.: 14/771,369

(22) PCT Filed: Aug. 22, 2013

(86) PCT No.: PCT/JP2013/072404
§ 371 (c)(1),
(2) Date: Aug. 28, 2015

(87) PCT Pub. No.: WO2015/025401
PCT Pub. Date: Feb. 26, 2015

(65) Prior Publication Data
US 2016/0004727 A1  Jan. 7, 2016

(51) Int. Cl.
G06F 7/00 (2006.01)
G06F 17/30 (2006.01)

(52) U.S. Cl.
CPC .. G06F 17/30292 (2013.01); G06F 17/30339 (2013.01)

(58) Field of Classification Search
None
See application file for complete search history.

(56) References Cited

U.S. PATENT DOCUMENTS

| 5,551,027 A | 8/1996 | Choy et al. |
| 2010/0094882 A1* | 4/2010 | Lee .............. G06F 17/30545 707/755 |
| 2010/0094892 A1* | 4/2010 | Bent ............. G06F 17/30545 707/760 |

(Continued)

FOREIGN PATENT DOCUMENTS

JP  2012-150547 A  8/2012

OTHER PUBLICATIONS

Stanek, William, Microsoft SQL Server 2008 Official Manual, 1st edition, Nikkei BP Soft Press, Oct. 19, 2009 (Oct. 19, 2009), pp. 376 to 377.

(Continued)

*Primary Examiner* — Thu Nga Nguyen
(74) *Attorney, Agent, or Firm* — Volpe and Koenig, P.C.

(57) ABSTRACT

A database management system receives a new data table input to a database; and executes unique constraint determination processing of determining whether each comparison-subject value as each value registered in a target column in the new data table is different from each comparison reference value as each value registered in a target column in a stored data table in the database, and stores the new data table in a second database area different from a first database area storing the stored data table in the database when a determination result obtained in the unique constraint determination processing is true.

15 Claims, 15 Drawing Sheets

(56) References Cited

U.S. PATENT DOCUMENTS

2014/0129577 A1* 5/2014 Young, Jr. ........... G06F 17/3089
707/758
2014/0359581 A1* 12/2014 Soshin ................ G06F 11/3692
717/126

OTHER PUBLICATIONS

Jureichi Niino, SQL Server7.0 de Risoteki na Database o Kochiku shiyo DBA [Database Administrator] ni naru Tameno SQL Dojo Dai 6 Kai, Windows NT World, Oct. 1, 1999 (Oct. 1, 1999), vol. 4 No. 10, pp. 184 to 187.

Yasuhiro Imamura, DB Beginner mo, 2000/2005 User mo! SQL Server 2008 de Ittemiyo, DB Magazine, Oct. 1, 2009 (Oct. 1, 2009), vol. 19, No. 6, pp. 84 to 90.

* cited by examiner

Fig. 4

Management point management table

| S_TIME | F_TIME | S_SEG | F_SEG | TABLE | LD_ID |
|---|---|---|---|---|---|
| 20081231220500 | 20090101045000 | 1 | 2000 | T1 | 0 |
| 20090101231200 | 20090102053500 | 2001 | 4500 | T2 | 1 |
|  |  | 10001 | 15000 |  |  |
| 20090102060016 | 20090102080516 | 4501 | 5000 | T1 | 2 |
| 20090102230000 | 20090103035300 | 5001 | 5050 | T2 | 3 |
| .... | .... | .... | .... | .... | .... |

Fig. 7

300 → Column value range list

| LD_ID (301) | UC_ID (302) | MIN (303) | MAX (304) |
|---|---|---|---|
| 0 | 0 | 1 | 10 |
| 1 | 0 | 5 | 15 |

Fig. 8

400 → Comparison value list

| LD_ID (401) | HASH_V (402) |
|---|---|
| 0 | 0 |
| 0 | 2 |
| 0 | 5 |
| 1 | 2 |
| 1 | 4 |
| 1 | 6 |
| 1 | 7 |

Fig. 17

410  Comparison target LD list

| LD_ID (411) | UC_ID (412) | Number of comparison targets (413) |
|---|---|---|
| 0 | 0 | 1 |
| 1 | 0 | 5 |

US 9,971,793 B2

DATABASE MANAGEMENT SYSTEM AND DATABASE MANAGEMENT METHOD

TECHNICAL FIELD

The present invention generally relates to database management technology.

BACKGROUND ART

In recent years, there has been an increasing demand for analyzing big data by using a database that manages a large amount of data in units of petabytes (hereinafter, referred to as "PByte"). Because data freshness is an important factor in the analysis on such big data, there has been a demand for adding data in units of several gigabytes (hereinafter, GByte) while searching processing is in process. In this context, a method has been known in which a storing area for a data table to be newly added (hereinafter, referred to as "new data table") is distinguished from an existing area (area for a stored data table) (For example, PTL1).

According to PTL 1, every time a new data table is input, an area different from the existing area is reserved as a storage destination of the new data table, and the new data table is stored in the reserved area.

In this method, to determine whether a target column in the new data table stored in the area satisfies a unique constraint condition (a condition for ensuring uniqueness), the target columns in the new data table need to be compared with the target columns in the stored data table in the all the existing areas (for example, PTL2).

CITATION LIST

Patent Literature

[PTL 1] Japanese Patent Application Publication No. 2012-150547
[PTL 2] U.S. Pat. No. 5,551,027

SUMMARY OF INVENTION

Technical Problem

According to PTLs 1 and 2, the uniqueness of the target column in the new data table may be ensured through the following processing. Specifically, every time a new data table is input, a database area different from the existing database area storing the stored data table is reserved, and the new data table is stored in the reserved database area, and then to determine whether a target column in the new data table stored in the database area satisfies a unique constraint condition, the data in the new data table is compared with all pieces of the stored data. However, such processing involves a large processing cost.

An object of the present invention is to reduce a processing cost for ensuring uniqueness of a target column in a new data table, in an environment in which the new data table is stored in a database area different from an existing database area.

Solution to Problem

A database management system receives a new data table input to a database, executes unique constraint determination processing of determining whether each comparison-subject value as each value registered in a target column in the new data table is different from each comparison reference value as each value registered in a target column in a stored data table in the database, and stores the new data table in a second database area different from a first database area storing the stored data table in the database when a determination result obtained in the unique constraint determination processing is true.

Advantageous Effects of Invention

According to the present invention, a processing cost for ensuring uniqueness of a target column in a new data table can be reduced, in an environment in which the new data table is stored in a database area different from an existing database area.

BRIEF DESCRIPTION OF DRAWINGS

FIG. 4 is a diagram illustrating a configuration example of a management point management table.
FIG. 7 is a diagram illustrating a Table information management table of a column value range list.
FIG. 8 is a diagram illustrating a configuration example of a compared value list.
FIG. 17 is a diagram illustrating a configuration example of a comparison target LD list.

DESCRIPTION OF EMBODIMENTS

Figure 1:
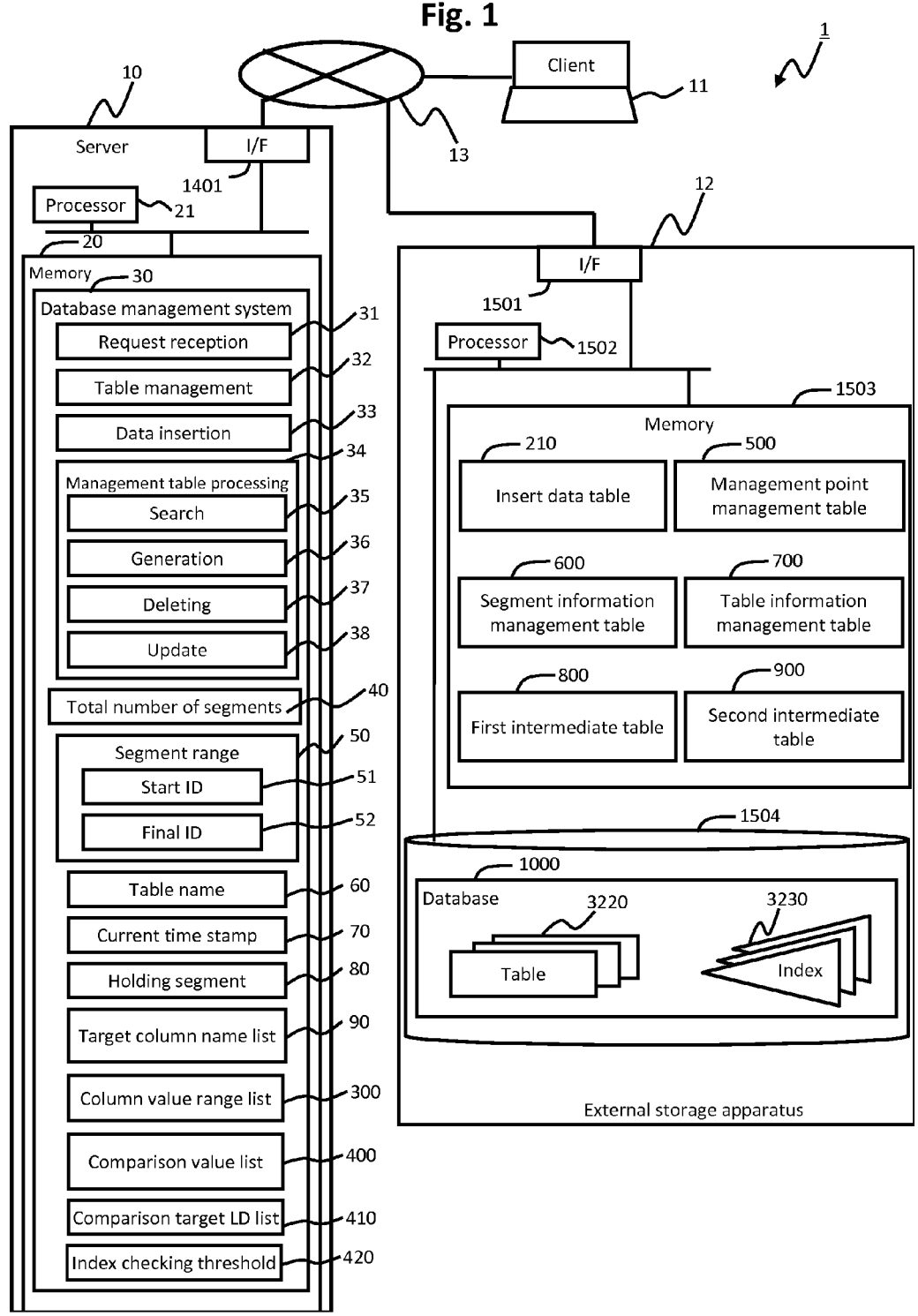
FIG. 1 is a block diagram illustrating an example of a computer system according to an embodiment.

An embodiment is described below with reference to the drawings. In the drawings, the reference numerals for similar elements are provided with identical parent numbers. When the similar elements are described without being distinguished from each other, the similar elements are described only with the parent number. When the similar elements are described while being distinguished from each other, all the necessary reference numerals are used.

Figure 14:
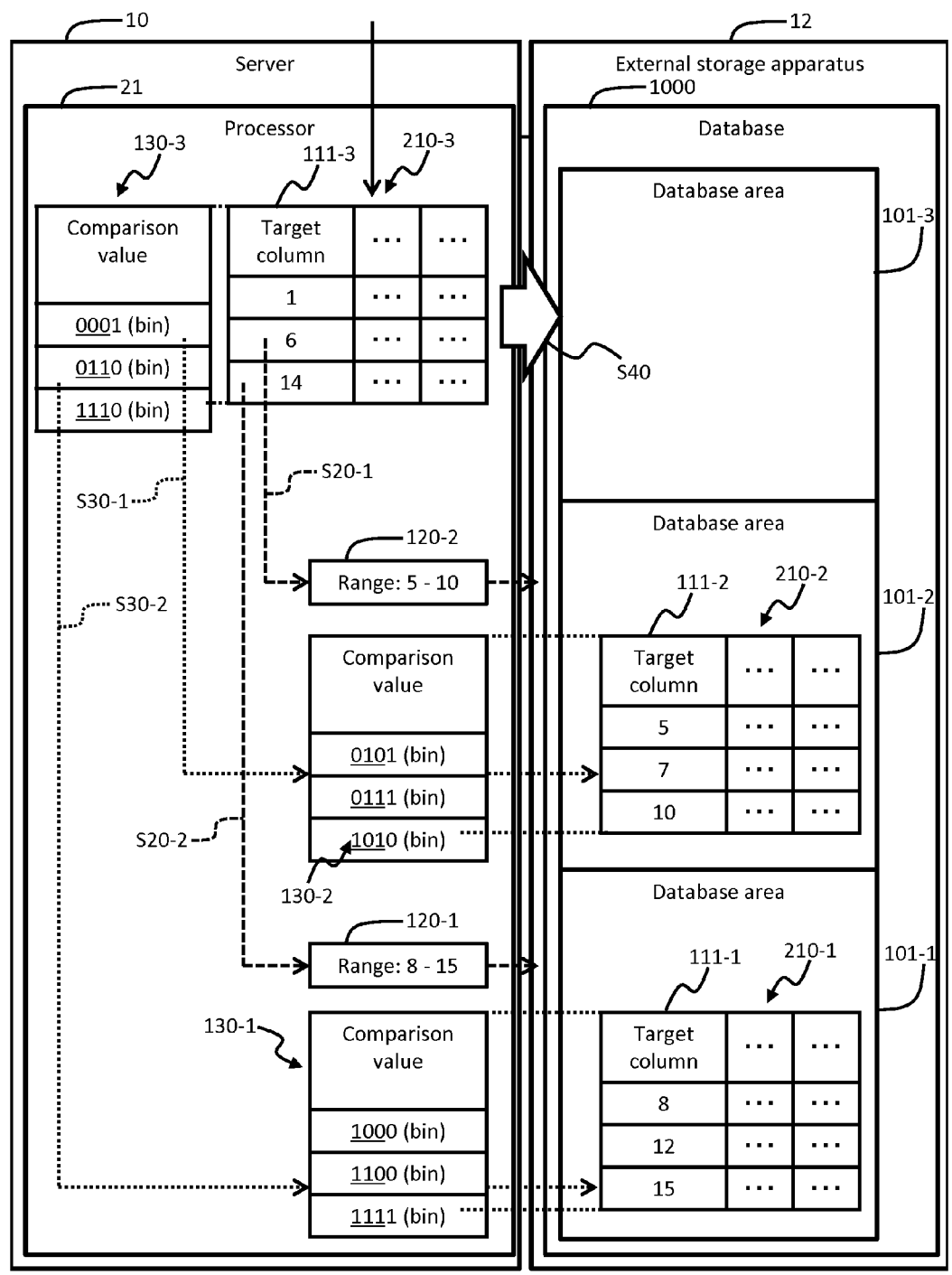
FIG. 14 is a schematic diagram illustrating an overview of the embodiment.

FIG. 14 is a schematic diagram illustrating an overview of the present embodiment.

A server 10 is an example of a computer and includes a processor 21. A processor 21 is connected to an external storage apparatus 12.

The external storage apparatus 12 stores a database 1000 including a plurality of database areas 101. The database area 101 includes at least one segment of a predetermined size.

When a data table 210 is input, the processor 21 reserves the database area 101 based on the size of the insertion data table 210 (that is, determines the number of allocated segments). Then, the processor 21 stores the insertion data table 210 in the reserved database area 101. This processing is executed every time the data table 210 is input. The server 10 may include an unillustrated input device (for example, an I/F (communication interface device)), and the data table 210 may be input from the input device. For example, the data table 210 may be input from an unillustrated client, or may be input (read) from the external storage apparatus 12.

One specific example is described below with reference to FIG. 14. It is assumed that a unique constraint condition is configured to a target column 111 in a plurality of columns in the data table 210. Here, the "target column" is a column having a target attribute among one or more attributes (items) in the data table 210. The target attribute is the same among a plurality of target columns respectively corresponding to a plurality of data tables 210. A value registered in the target column is hereinafter referred to as a "target column value". When the data table 210 includes a plurality of records, a plurality of target column values are generally registered in the target column. The "unique constraint condition" is a condition corresponding to a constraint for achieving a state where the target column values are not redundantly stored. It is assumed that in a state where data tables 210-1 and 110-2 have been respectively stored in data base areas 210-1 and 110-2, a new data table 210-3 is input to the server 10. The data tables 210-1 and 210-2 forma single Table.

The processor 21 determines whether a target column value (hereinafter, referred to as a "comparison-subject value") in a target column 111-3 in the insertion data table 210-3 satisfies the unique constraint condition with respect to the target column values in the stored data tables 210-1 and 210-2 (that is, whether the comparison-subject value is different from any of the target column values in the target columns 111-1 and 111-2 in the stored data tables 210-1 and 210-2). The data table 210-3 that is determined to satisfy the unique constraint condition is added as a component of the Table. For example, the processing of determining whether the data table 210-3 satisfies the unique constraint condition includes first stage determination processing and second stage determination processing described below.

(First Stage Determination Processing)

The processor 21 determines whether column value ranges 120-1 and 120-2, respectively corresponding to the stored data tables 210-1 and 210-2, include a target column value that is the same as the comparison-subject value, for each comparison-subject value. A column value range 120 is a range between minimum and maximum values in the target column values (hereinafter, referred to as a "comparison reference value") registered in the corresponding stored data table 210. The column value range 120 includes the minimum and the maximum values of the comparison reference value. The processor 21 determines that the comparison-subject value not included in the column value ranges 120 satisfies the unique constraint condition. More specifically, a comparison-subject value "1" is not included in the column value range 120-1 ("8" to "15") or the column value range 120-2 ("5" to "10"), and thus satisfies the unique constraint condition. On the other hand, a comparison-subject value "6" is included in the column value range 120-2 ("5" to "10"), and thus is subjected to the subsequent second stage determination processing (S20-1). Similarly, a comparison-subject value "14" is included in the column value range 120-1 ("8" to "15"), and thus is subjected to the subsequent second stage determination processing (S20-2).

(Second Stage Determination Processing)

The processor 21 determines whether the comparison-subject value (hereinafter, referred to as "in-range comparison-subject value"), determined to be included in the column value range in the first stage determination processing, matches anyone of the comparison reference values in the data table with the corresponding column value range. The in-range comparison-subject value that matches none of the comparison reference values is determined to satisfy the unique constraint condition. The in-range comparison-subject value that matches any one of the comparison reference values is determined not to satisfy the unique constraint condition. In FIG. 14, an in-range comparison-subject value "14" matches none of the comparison reference values "8", "12", and "15" in the stored data table 210-1, and thus satisfies the unique constraint condition. Similarly, an in-range comparison-subject value "6" matches none of the comparison reference values "5", "7", and "10" in the data table 210-2 stored in the database area 101-1, and thus satisfies the unique constraint condition.

When it is determined that all the comparison-subject values in the insertion data table 210-3 satisfy the unique constraint condition, the processor 21 stores the insertion data table 210-3 in a database area (database area storing none of the data tables) 101-3 for the data table 210-3. In FIG. 14, all the comparison-subject values "1", "6", and "14" satisfy the unique constraint condition, and thus the processor 21 stores the data table 210-3 in the database area 101-3 (S40). Thus, the data table 210-3 is newly inserted into the Table including the data tables 210-1 and 210-2. When it is determined that any one of the comparison-subject values does not satisfy the unique constraint condition (for example, when there is at least one in-range comparison-subject value that does not satisfy the unique constraint condition), the processor 21 does not store the insertion data table 210-3 in the database area.

Through the processing described above, the uniqueness of each target column 111 in the data tables stored in the plurality of data areas 101 can be ensured. The processor 21 first performs the first stage determination processing to find a rough comparison-subject value satisfying the unique constraint condition, and then performs the detail second stage determination processing, subsequent to the first stage determination processing, only on the comparison-subject value that is determined not to satisfy the unique constraint condition. Thus, whether the target column 111-3 has the uniqueness can be quickly determined.

The processor 21 may determine whether the in-range comparison-subject value matches the comparison reference value in the second stage determination processing in the following manner.

The processor 21 stores, for each of the comparison-subject value and the comparison reference value, N highest order two digit bits (N is a natural number) in a comparison table 130. The processor 21 determines whether the highest order bits of the in-range comparison-subject value match the N highest order bits of each comparison reference value. The in-range comparison-subject value, with the highest order bits not matching the N highest order bits of any of the comparison reference values, is determined to satisfy the unique constraint condition. In FIG. 14, all the four bits as the binary representation of the target column value are illustrated. However, the underlined three highest order bits (N=3) are actually stored in the comparison table 130.

When there is the comparison reference value with the highest three bits matching the highest three bits of the in-range comparison-subject value, the processor 21 determines whether the in-range comparison-subject value matches the comparison reference value with the matching three highest order bits. The processor 21 determines that, when the in-range comparison-subject value does not match any of such comparison reference values, the unique constraint condition is satisfied. When the in-range comparison-subject value matches any of such comparison reference values, it is determined that the unique constraint condition is satisfied. When there is an in-range comparison-subject value not satisfying the unique constraint condition, the processor 21 may not store the insertion data table 210-3 in the data area 101, as in the second determination processing described above.

For example, the processor 21 prepares a comparison table 130-3 storing sets of three highest bits "000", "011", and "111" respectively corresponding to the comparison-subject values "1", "6", and "14". The comparison-subject value "1" is included in none of the column value ranges 120-1 and 120-2 in the first stage determination processing, and thus is not subjected to the determination based on the compared values. The comparison-subject value "6" is determined to be included in the column value range 120-2 in the first stage determination processing. Thus, the processor 21 determines whether the comparison table 130-2 corresponding to the column value range 120-2 includes the three highest bits matching the three highest bits "011" of the in-range comparison-subject value "6". The comparison table 130-2 includes the matching three highest bits "011", and thus the processor 21 compares the in-range comparison-subject value "6" with the comparison reference value with the three highest bits "011". Here, the comparison reference value "7" is the only comparison reference value with the three highest bits "011" in the data table 210-2, and thus it is found that the data table 210-2 includes no comparison reference value matching the in-range comparison-subject value "6". Thus, the in-range comparison-subject value "6" is determined to satisfy the unique constraint condition (S30-1). The other in-range comparison-subject value "14" is similarly processed, and it is found that the in-range comparison-subject value "14" matches none of the comparison reference values in the data table 210-1. Thus, the in-range comparison-subject value "14" is also determined to satisfy the unique constraint condition (S30-2).

In the modification, the sets of the N high order bits are compared with each other so that whether the values match can be determined more quickly. This is effective when the comparison-subject value and the comparison reference value are large. Another modification of the second stage determination processing using a method other than that based on the comparison between the sets of the N high order bits may be employed. For example, in one modification of the second stage determination processing, hash values of the comparison-subject value and the comparison reference value may be compared with each other. The N high order bits or the hash value may be regarded as an information amount reduced value obtained by reducing an information amount of an attribute value of the target column. Thus, the modification of the second stage determination processing may be regarded as processing of comparing the information amount reduced value of the comparison-subject value with the information amount reduced value of the comparison reference value.

An overview of the present embodiment is as described above. The plurality of data tables stored in the plurality of storage areas 101 are each an element of the database, and are each an element of a Table as one type of a database schemer for example. The database may be stored in a storage device (for example, a memory or an auxiliary storage device) in the server 10, instead of the external storage apparatus 12.

The present embodiment is described in detail below.

FIG. 1 is a block diagram illustrating an example of a computer system 1 according to the present embodiment.

The computer system 1 includes a server 10, an external storage apparatus 12, and a client 11. The server 10, the external storage apparatus 12, and the client 11 can transmit and receive data in a bidirectional manner through a communication network 13. In the computer system 1, the client 11 serves as an input device that inputs information to the server 10 and as a display device that displays information output from the server 10. Alternatively, the server 10 may include an input/output device and may input and output (display) information through the input/output device.

As described above, the server 10 includes an I/F (for example, NIC (Network Interface Card)) 1401, the memory 20, and the processor 21 connected to the elements. Other types of storage devices may be employed instead of or in addition to the memory 20.

The memory 20 stores a database management system 30. The database management system 30 may be loaded from an unillustrated auxiliary storage device, or may be loaded from an apparatus at a remote location such as the external storage apparatus 12. The processor 21 executes processing of the database management system 30 stored in the memory 20. Processing and the like may be described below with the database management system 30 (or an element of the database management system 30) as the subject. However, the subject of the processing executed by the database management system 30 may also be the processor 21 or the server 10.

The database management system 30 controls a database 1000 stored in the external storage apparatus 12. The client 11 can access the database 1000 through the database management system 30.

The external storage apparatus 12 includes an I/F (for example, NIC) 1501, a memory 1503, a storage device group 1504, and a processor 1502 connected to these elements. Communications can be performed with the server 10 and the client 11 through the I/F 1501. The storage device group 1504 includes one or plural storage devices, and stores the database 1000. The memory 1503 stores an insertion data table 210, a management point management table 500, a segment information management table 600, a Table information management table 700, a first intermediate table 800, and a second intermediate table 900.

The database 1000 includes one or more Tables 3220 and may further include one or more indexes 3230. The Table 3220 is a set of one or more records. The record includes one or more columns. The index 3230 is a data structure generated for one or more columns in the Table 3220 to access at a higher speed to the Table 3220 in accordance with a selection condition including the column related to the index 3230. For example, the index 3230 is a data structure holding, for each value in the target column, information for identifying a record including the value in the Table. For example, a B tree is used as the data structure. A physical address, a logical row ID, or the like may be used as the information for identifying the record. Furthermore, the database 1000 may further include a database statistic. For example, the database statistic may include information related to data in the database 1000 such as: information indicating the number of entries in the index 3230; information indicating the number of records in the Table 3220; a maximum value, an average value, and a minimum value of values in each column; and a distribution of the values in each column.

The insertion data table 210 includes data to be inserted into the Table 3220. The management point management table 500 manages an operation on the database 1000. The segment information management table 600 and the Table information management table 700 are used for operating the database 1000. Database related information is information including the insertion data table 210, the management point management table 500, the segment information management table 600, and the Table information management table 700.

A segment represents a unit of a data storage area in the database 1000. The database 1000 includes a plurality of segments each storing a data table. Each segment is associated with an ID provided by the database management system 30.

The segment information management table 600 manages information related to the segment. The database management system 30 manages a stored position of data by using the Table information management table 700 and the segment information management table 600. For example, the insertion data table 210 is stored in the external storage apparatus 12 by a user (for example, an administrator) of the database 1000 through the client 11.

The first intermediate table 800 and the second intermediate table 900 are used in unique constraint determination processing described later. The first intermediate data table 800 stores a result of first stage determination processing in the unique constraint determination processing. The second intermediate data table 900 stores a result of second stage determination processing executed after the first stage determination processing.

The management point management table 500 manages information related to a range of segments to which the insertion data table 210 are inserted in data table insertion processing described later, a Table to which the insertion data tables 210 are inserted, and the start time point and end time point of the data table insertion processing. The management point management table 500 is controlled by a management table processing unit 34 of the database management system 30. When the data table insertion processing is executed once, a single record (management point record) is added to the management point management table 500.

The segment information management table 600 manages the state of the segments in the database 1000. The segment information management table 600 is managed by the database management system 30.

The Table information management table 700 manages the state of the Table 3220 in the database 1000. The Table information management table 700 is managed by the database management system 30.

Upon receiving an insertion processing request, a data table deleting processing request, or the like from the client 11, the database management system 30 executes processing corresponding to the request.

Upon receiving an access request from the client 11, the database management system 30 accesses the database 1000 of the external storage apparatus 12. The database management system 30 includes a data operation request reception unit 31, an information management table management unit 32, a Table data insertion unit 33, and the management table processing unit 34.

The data operation request reception unit 31 receives the insertion processing request or the data table deleting processing request from the client 11. The information management table management unit 32 manages data in each information management table of the external storage apparatus 12. The Table data insertion unit 33 executes processing of inserting data into the Table 3220 in the data table insertion processing.

The management table processing unit 34 manages processing on the management point management table 500. As described later, the management table processing unit 34 includes a management point record search processing 35, a management point record generation processing 36, a management point record deleting processing 37, and a management point record update processing 38.

The memory 20 stores data used for the data table insertion processing or the data table deleting processing, in addition to the database management system 30. For example, as such data, the memory 20 stores a total number of segments 40, a segment range 50, a Table name 60, a current time stamp 70, a holding segment 80, a target column name list 90, a column value range list 300, and a compared value list 400.

The total number of segments 40 includes the number of segments required for storing all the data (insertion data tables) in the data table insertion processing. The segment range 50 includes a range of segments to which the data is stored in the data table insertion processing or a range of segments storing data to be deleted in the data table deleting processing. The segment range 50 includes a start segment ID 51 indicating an ID of the first segment and an end segment ID 52 indicating an ID of the last segment.

The Table name 60 includes information for identifying the Table 3220 into which the data is inserted, in the data table insertion processing. The current time stamp 70 includes information indicating the current date and time. The holding segment 80 holds the segment ID of the segment that has stored the data most recently.

The target column name list 90 includes a list of names of columns (target columns) as targets of unique constraint condition in the Table 3220. A value of the target column registered in the target column name list 90 is the target column value in the present embodiment.

The column value range list 300 holds a column value range for the data table stored in each segment. The column value range is a range between the minimum value and the maximum value of the target column values in the data table.

The compared value list 400 holds a compared value (information amount reduced value) calculated from the target column value for each stored data table (or each segment storing the data table). A comparison target LD list 410 and an index checking threshold 420 are used in the unique constraint determination processing described later. Information indicating a result of the second stage determination processing executed after the first stage determination processing is stored. The index checking threshold 420 is used for selecting a method for processing a record stored in the second intermediate table in the processing executed after the second stage determination processing. Here, "LD" is short for load data.

Figure 2:
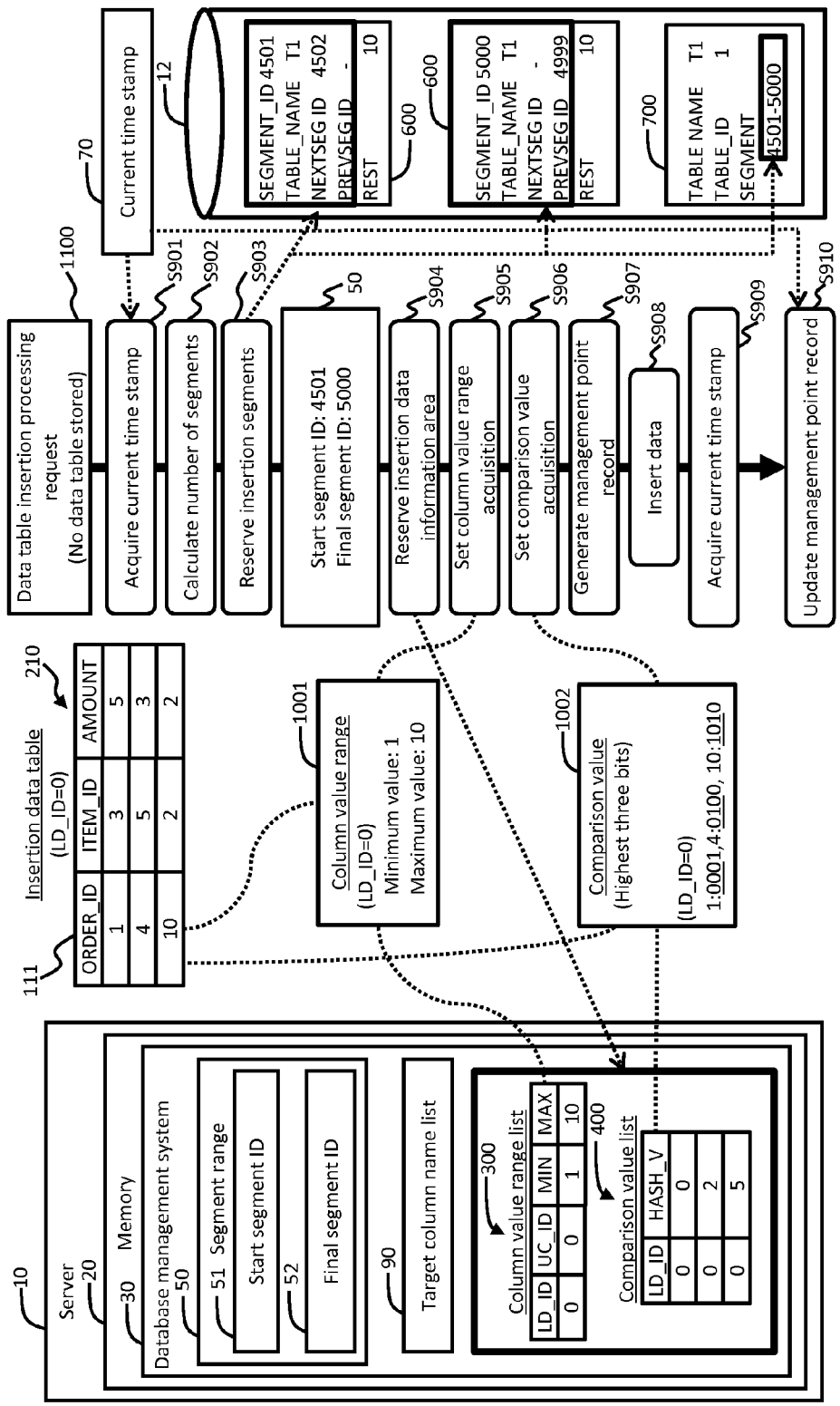
FIG. 2 is a flowchart illustrating an overview of data table insertion processing in a case where no stored data table is in a database.

FIG. 2 is a flowchart illustrating an overview of the data table insertion processing in a case where no stored data table is in the database 1000. In FIG. 2 (and in FIG. 3), a target attribute (target column) is "ORDER_ID".

The data operation request reception unit 31 receives an insertion processing request 1100 from the client 11. The insertion processing request 1100 includes information (for example, a file name) for identifying the insertion data table 210 stored in the external storage apparatus 12. The data operation request reception unit 31 activates the Table data insertion unit 33 upon receiving the insertion processing request 1100.

When the data table insertion processing starts, the Table data insertion unit 33 acquires from the current time stamp 70 the current date and time to be configured as the start date and time (S901).

Next, the Table data insertion unit 33 reads the insertion data table 210 and calculates the number of segments required for storing the data to be inserted (S902), and then stores the number of segments thus calculated in the total number of segments 40.

The Table data insertion unit 33 reserves the segments for inserting in the database 1000 based on the total number of segments 40, and stores the start segment ID 51 and the end segment ID 52 of the inserted data in the segment range 50 on the memory 20 (S903).

Then, the management table processing unit 34 reserves a storage area for the column value range list 300 and the compared value list 400 through the management point record generation processing 36 (S904).

Then, the Table data insertion unit 33 stores the range of the target column values in the insertion data table 210, designated by the insertion processing request 1100, in the column value range list 300 (S905).

Then, the Table data insertion unit 33 stores in the compared value list 400, the compared values (information amount reduced values) corresponding to the target column values in the insertion data table 210 designated by the insertion processing request 1100 (S906).

The management table processing unit 34 generates a new record (management point record) in the management point management table 500 through the management point record generation processing 36. Then, through the management point record generation processing 36, the management table processing unit 34 stores the start date and time of the record (management point record) generated in S904 in S_TIME 511 (see FIG. 4) of the management point management table 500, stores the start segment ID 51 and the end segment ID 52, in collectively inserted data, respectively in S_SEG 513 and in F_SEG 514, and stores the name of the Table 3220 into which the data is collectively inserted in TABLE 515 (S907).

Then, the Table data insertion unit 33 adds the insertion data table 210 designated by the insertion processing request 1100 to a range from the start segment ID 51 to the end segment ID 52 reserved in the Table 3220 of the database 1000 (S908).

When the data table insertion processing is completed, the Table data insertion unit 33 acquires from the current time stamp 70 the current date and time to be configured as the end date and time (S909).

Finally, with a management point record update unit 38, the management table processing unit 34 stores the end date and time of the record (management point record) generated in S905 in F_TIME 512, and thus updates the new record in the management point management table 500 (S910).

As described above, in the data table insertion processing, the new management point record is added to the management point management table 500, with the start date and time (S_TIME 511) and the end date and time (F_TIME 512) of the data table insertion processing, the start segment (S_SEG 513) and the end segment (F_SEG 514) in the insertion data table and the table name (TABLE 515) stored.

More specifically, the management point management table 500 manages the Table name (TABLE 515), the start date and time (S_TIME 511) and the end date and time (F_TIME 512) of the data table insertion processing, and the start segment (S_SEG 513) and the end segment (F_SEG 514) indicating the inserted position of the insertion data table, after uniquely associating these with each other. Thus, when collectively deleting a data table at a later date, the user can easily recognize the stored position of the data table by designating the start date and time and the end date and time of the data table insertion processing as the search condition.

Figure 3:
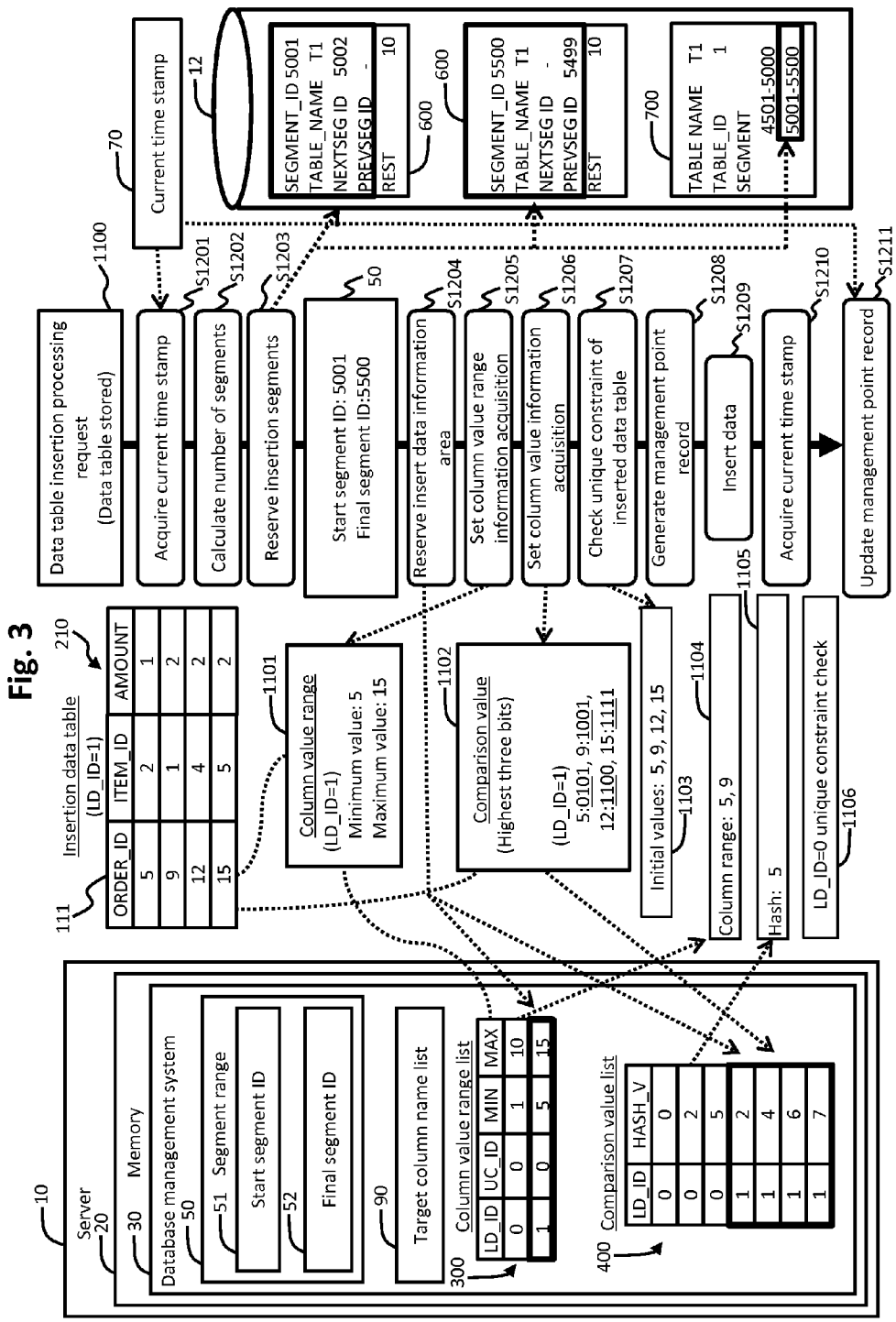
FIG. 3 is a flowchart illustrating an overview of data table insertion processing in a case where a stored data table is in the database.

FIG. 3 is a flowchart illustrating an overview of the data table insertion processing in a case where a stored data table is in the database 1000.

The data operation request reception unit 31 receives the insertion processing request 1100 from the client 11. The insertion processing request 1100 includes information (for example, a file name) for identifying the insertion data table 210 stored in the external storage apparatus 12. Upon receiving the insertion processing request 1100, the data operation request reception unit 31 activates the Table data insertion unit 33.

When the data table insertion processing starts, the Table data insertion unit 33 acquires from the current time stamp 70 the current date and time to be configured as the start date and time (S1201).

Then, the Table data insertion unit 33 reads the insertion data table 210 and calculates the number of segments required for storing the data to be inserted (S1202), and then stores the number of segments thus calculated in the total number of segments 40.

The Table data insertion unit 33 reserves the segments corresponding to the value of the total number of segments 40 in the database 1000, and stores the start segment ID 51 and the end segment ID 52 of the inserted data in the segment range 50 on the memory 20 (S1203).

Then, the management table processing unit 34 reserves a storage area for the column value range list 300 and the compared value list 400 through the management point record generation processing 36 (S1204).

Then, the Table data insertion unit 33 stores in the column value range list 300, the range of the target column values of the data in the insertion data table 210 designated by the insertion processing request 1100 (S1205).

Then, the Table data insertion unit 33 stores in the compared value list 400, the compared values (information amount reduced values) corresponding to the target column values of the data in the insertion data table 210 designated by the insertion processing request 1100 (S1206).

The Table data insertion unit 33 compares the target column value in the insertion data table 210 designated by the insertion processing request 1100 with the column value range registered in the column value range list 300, and determines whether the target column value is included in the column value range. When the target column value is included in the column value range, the Table data insertion unit 33 registers the target column value and the LD_ID corresponding to the target column value range including the target column value in the first intermediate table 800 (S1207). The LD_ID is an ID (identifier) of the insertion data table, and LD is short for load data.

The Table data insertion unit 33 acquires the target column value and the LD_ID corresponding to the target column value from the first intermediate table 800. Then, the Table data insertion unit 33 compares the compared value corresponding to the target column value with a plurality of compared values in the compared value list 400 corresponding to the LD_ID. Then, the Table data insertion unit 33 registers in the second intermediate table 900, the matching target column value obtained by the comparison and the LD_ID corresponding to the compared value list 400 matching the target column value (S1207).

The Table data insertion unit 33 acquires the target column value and the LD_ID corresponding to the target column value from the second intermediate table 900. The Table data insertion unit 33 determines whether the target column value matches any one of the target column values corresponding to the LD_ID. When the target column value matches any one of the target column values, the Table data insertion unit 33 cancels the data table insertion processing, and notifies a program that has issued the processing request that the unique constraint condition is not satisfied. When the target column value matches none of the target column values, the Table data insertion unit 33 executes the next processing.

Next, the management table processing unit 34 generates a new record (management point record) in the management point management table 500 through the management point record generation processing 36. Then, through the management point record generation processing 36, the management table processing unit 34 stores the start date and time of the record (management point record), generated in S1204, in S_TIME 511 (see FIG. 4) of the management point management table 500, stores the start segment ID 51 and the end segment ID 52, indicating the insertion data table 210 storing, respectively in S_SEG 513 and F_SEG 514, and stores the name of the Table 3220 into which the insertion data table is inserted in TABLE 515 (S1208).

The Table data insertion unit 33 stores the insertion data table 210 designated by the insertion processing request 1100 in the range from start segment ID 51 to the end segment ID 52 reserved in the Table 3220 of the database 1000 (S1209).

When the insertion of the insertion data table 210 is completed, the Table data insertion unit 33 acquires from the current time stamp 70 the current date and time to be configured as the end date and time (S1210).

Finally, with the management point record update unit 38, the management table processing unit 34 stores the end date and time of the record (management point record) generated in S1205 in F_TIME 512, and thus updates the new record in the management point management table 500 (S1211).

As described above, in the data table insertion processing, the new management point record is added to the management point management table 500 with the start date and time (S_TIME 511) and the end date and time (F_TIME 512) of the data table insertion processing, the start segment (S_SEG 513) and the end segment (F_SEG 514) in the insertion data table, and the Table name (TABLE 515) stored.

More specifically, the management point management table 500 manages the Table name (TABLE 515), the start date and time (S_TIME 511) and the end date and time (F_TIME 512) of the data table insertion processing, and the start segment (S_SEG 513) and the end segment (F_SEG 514) indicating the inserted position of the data, after associating these with each other. Thus, when collectively deleting a data table at a later date, the user can easily recognize the stored position of the data by designating the start date and time and the end date and time of the data table insertion processing as the search condition.

The storing of the insertion data table 210 is cancelled when any one of the target column values in the insertion data table 210 matches any one of the target column values in the stored data table. In other words, the insertion data table 210 is stored when all the target column values in the stored data table satisfy the unique constraint condition. Thus, the uniqueness of the target column value in the insertion data table 210 can be ensured.

FIG. 4 is a diagram illustrating a configuration example of the management point management table 500.

The management table processing unit 34 generates and manages the management point management table 500 on the database 1000.

The management point management table 500 includes a plurality of records. The records include S_TIME 511, F_TIME 512, S_SEG 513, F_SEG 514, TABLE 515, and LD_ID 516 as data attributes.

S_TIME 511 indicates the date and time at which the processing of inserting the insertion data table 210 starts (start date and time). F_TIME 512 indicates the date and time at which the data table insertion processing ends (end data and time). S_SEG 513 indicates the ID of the segment at the point when the insertion of the insertion data table 210 starts (start segment ID). F_SEG 514 indicates the ID (end segment ID) of the segment at the point when the insertion of the insertion data table 210 ends. TABLE 515 indicates a name or an identifier (Table name) of the Table as a target of the processing of inserting the insertion data table 210. LD_ID 516 indicates an ID with which the insertion data table registered in the data table insertion processing can be uniquely identified. S_SEG 513 and F_SEG 514 may include a plurality of elements (repeated column) for each record.

For example, a record 517 in FIG. 4 indicates that the start date and time (S_TIME 511) of the data table insertion processing is "06:00:16 Jan. 2, 2009", the end date and time (F_TIME 512) of the data table insertion processing is "08:05:16 Jan. 2, 2009", the start segment ID (S_SEG 513) of the insertion data table is "4501", the end segment ID (F_SEG 514) of the insertion data table is "5000", the name (TABLE 515) of the target Table is "T1", and LD_ID is "2".

Figure 5:
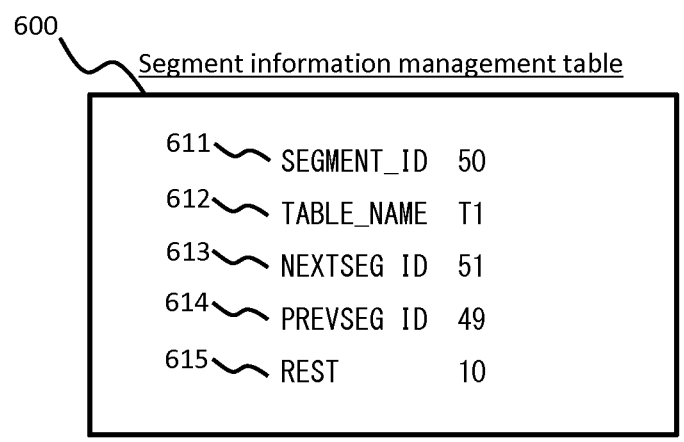
FIG. 5 is a diagram illustrating a configuration example of a segment information management table.

FIG. 5 is a diagram illustrating a configuration example of the segment information management table 600.

The segment information management table 600 is generated for each segment. The segment information management table 600 includes, as data attribute, SEGMENT_ID 611, TABLE_NAME 612, NEXTSEG_ID 613, PREVSEG_ID 614, and REST 615.

SEGMENT_ID 611 indicates SEGMENT_ID as an identifier of the segment. TABLE_NAME 612 represents the name of the Table including the segment indicated by SEGMENT_ID 611. NEXTSEG_ID 613 indicates the identifier (SEGMENT_ID) of the segment subsequent to the segment indicated by SEGMENT_ID 611. PREVSEG_ID 614 indicates the identifier (SEGMENT_ID) of the segment previous to the segment indicated by SEGMENT_ID 611. REST 615 represents a data amount (number of pages) that can be stored in the segment indicated by SEGMENT_ID 611.

Figure 6:
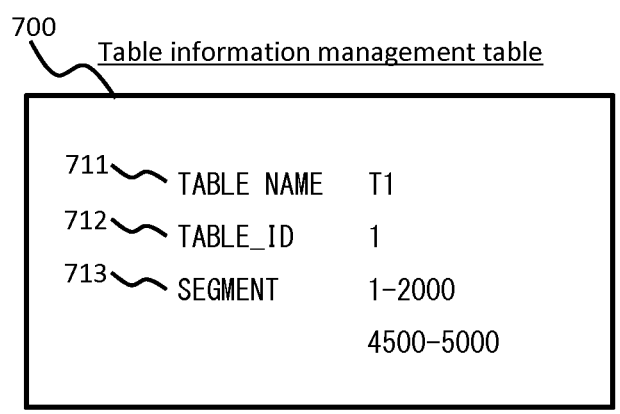
FIG. 6 is a diagram illustrating a configuration example of a Table information management table.

FIG. 6 is a diagram illustrating a configuration example of the Table information management table 700.

The Table information management table 700 is generated for each Table stored in the database 1000. The Table information management table 700 includes as data attributes, TABLE_NAME 711, TABLE_ID 712, and SEGMENT 713.

TABLE_NAME 711 indicates the table name as the name of a Table. TABLE_ID 712 indicates the identifier of the Table. SEGMENT 713 indicates a range of the segment used by the Table. SEGMENT 713 may indicate the range of a plurality of segments. For example, the Table information management table 700 illustrated in FIG. 6 indicates that the Table indicated by TABLE_ID 712 uses a range of segment IDs "1 to 2000" and a range of segment IDs "4501 to 5000".

FIG. 7 is a diagram illustrating a configuration example the column value range list 300.

The column value range list 300 includes for each LD_ID, the column value range (the minimum value and the maximum value) in the data table corresponding to the LD_ID, as a record. The column value range list 300 includes as data attributes, LD_ID 301, UC_ID 302, MIN 303, and MAX 304.

As described above, LD_ID 301 indicates an ID for uniquely identifying the insertion data table 210. UC_ID 302 indicates an ID for uniquely identifying the target column. MIN 303 indicates the minimum value in the target list values in the target list (UC_ID 302) in the insertion data table corresponding to LD_ID 301. MAX 304 indicates the maximum value in the target list values in the target list (UC_ID 302).

For example, FIG. 7 indicates that the minimum value is "1" and the maximum value is "10" in a plurality of target column values corresponding to "0" as UC_ID 302 in the insertion data table 210 with "0" as LD_ID 301.

FIG. 8 is a diagram illustrating a configuration example of the compared value list 400.

The compared value list 400 includes as data attributes, LD_ID 401 and HASH_V 402 indicating the compared value, for each LD_ID.

As described above, LD_ID 401 indicates an ID for uniquely identifying the insertion data table 210. HASH_V 402 indicates the compared value of each target column value in the data table corresponding to LD_ID 401. For example, the compared value is a hash bit map value, and may be the three highest order bits in a value (bit string) as a binary representation of the target column value.

FIG. 17 is a diagram illustrating a configuration example of the comparison target LD list 410.

The comparison target LD list 410 includes for each LD_ID, the number of column values stored in the second intermediate table in the data table corresponding to the LD_ID, as a record. The comparison target LD list 410 includes as data attributes, LD_ID 411, UC_ID 412, and a number of comparison targets 413.

As described above, LD_ID 411 indicates an ID for uniquely identifying the insertion data table 210. UC_ID 412 indicates an ID for uniquely identifying the target column. The number of comparison targets 413 represents the number of values, in the target list values in the target list (UC_ID 412) in the insertion data table corresponding to LD_ID 411, stored in the second intermediate table.

For example, FIG. 17 indicates that the second intermediate table stores one of a plurality of target column values corresponding to "0" as the UC_ID 412 in the insertion data table 210 with "0" as LD_ID 411.

For example, FIG. 8 indicates that "0", "2", and "5" are the compared values of the target column values in the data table with "0" as LD_ID 401.

Figure 9:
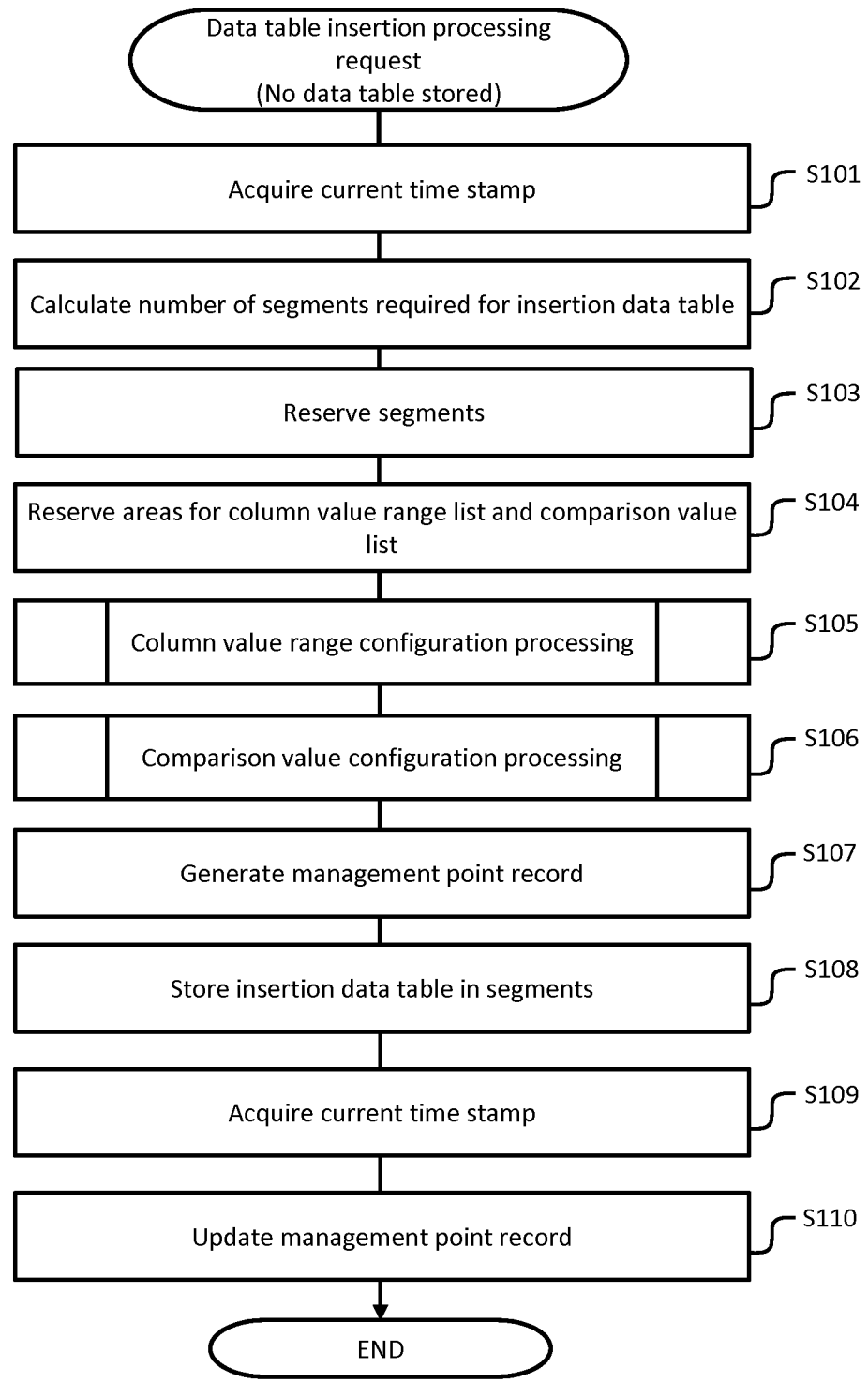
FIG. 9 is a flowchart illustrating an example of data table insertion processing in a case where no stored data table is in the database.

FIG. 9 is a flowchart illustrating an example of the data table insertion processing in a state where no stored data table is in the database 1000. FIG. 9 illustrates the processing in FIG. 2 in detail.

For example, the processing starts when the data operation request reception unit 31 receives the table name of the table as the insertion target and the name of the insertion data table 210 as the insertion target from the client 11.

When the data table insertion processing starts, the Table data insertion unit 33 acquires the current date and time from the current time stamp 70 (S101).

The Table data insertion unit 33 refers to the number of records and the capacity of the designated insertion data table 210, and calculates the number of segments required for adding the insertion data table 210 to the designated Table 3220 (S102). The Table data insertion unit 33 stores the calculated number of segment in the total number of segments 40 on the memory 20.

The Table data insertion unit 33 reserves the segments for storing the insertion data table 210 in the area of the database 1000 of the external storage apparatus 12 (S103). The Table data insertion unit 33 stores the first segment ID and the last segment ID of the secured segments respectively in the start segment ID 51 and the end segment ID 52 in the segment range 50.

Through the management point record generation processing 36, the management table processing unit 34 reserves storage areas for the column value range list 300 and the compared value list 400 (S104).

The Table data insertion unit 33 stores in the column value range list 300, the minimum value and the maximum value of the target column values in the insertion data table 210 (S105). This processing is described in detail later. The insertion data table 210 may be a data table read from the external storage apparatus 12 or a data table input from the client 11.

The Table data insertion unit 33 stores in the compared value list 400, the compared value of the target column value in the insertion data table 210 (S106). This processing is described in detail later.

Through the management point record generation processing 36, the management table processing unit 34 generates a new management point record and adds the record to the management point management table 500. In the management point record generation processing 36, for the newly generated management point record, the value of the current time stamp 70 acquired in S101 is stored in S_TIME 511, the value of the start segment ID 51 acquired in S103 is stored in S_SEG 513, and the value of the end segment ID 52 acquired in S103 is stored in F_SEG 514 (S107).

The Table data insertion unit 33 stores the insertion data table 210 in the segment reserved in S103 (S108). Then, the Table data insertion unit 33 acquires the current time stamp 70 (S109).

Through the management point record update processing 38, the management table processing unit 34 stores the acquired value of the current time stamp in F_TIME 512, and updates the record that is added in S107 and that is in the management point management table 500, (S110).

Through the processing described above, the server 10 collectively adds the insertion data table 210 prepared by the user to the Table 3220, and registers in the management point management table 500, the start date and time and the end date and time of the collective data inserting as information for identifying the record added by the user.

Figure 10:
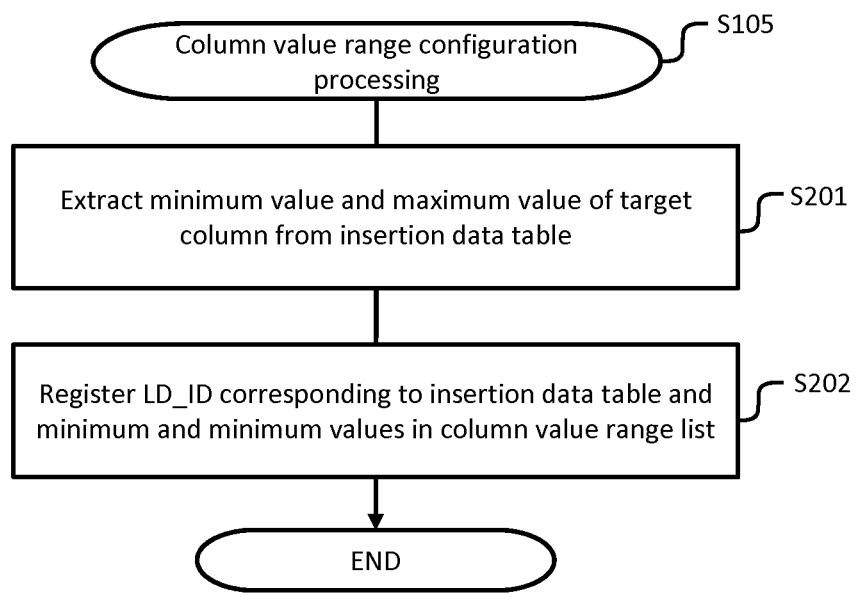
FIG. 10 is an example of a flowchart illustrating a detail of configuration processing of the column value range list.

FIG. 10 is an example of a flowchart illustrating a detail of configuration processing of the target column value range list 300. FIG. 10 illustrates the processing in S105 in FIG. 9 in detail.

The Table data insertion unit 33 acquires the minimum value and the maximum value of the target columns registered in target column name list 90, from the insertion data table 210 (S201).

The Table data insertion unit 33 registers in the column value range list 300, the LD_ID corresponding to the insertion data table 210 and the acquired minimum and maximum values (S202), and then the returns to S105.

Figure 11:
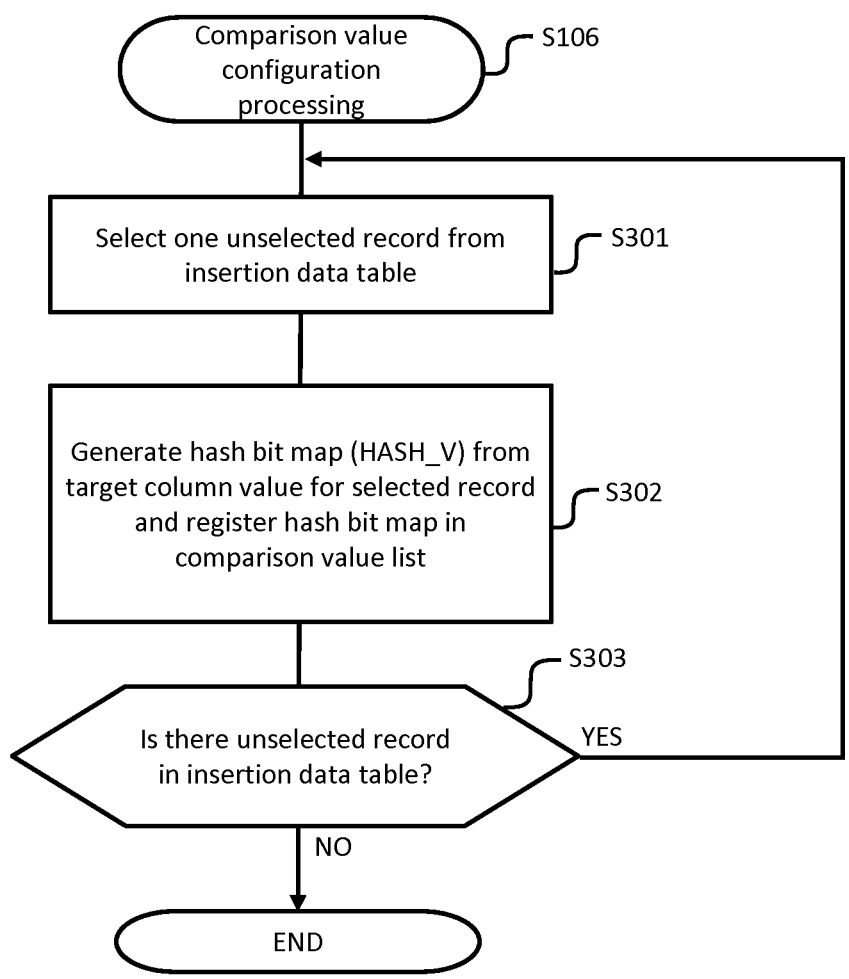
FIG. 11 is an example of a flowchart illustrating a detail of configuration processing of the compared value list.

FIG. 11 is an example of a flowchart illustrating a detail of configuration processing of the compared target column value list 400. FIG. 11 illustrates the processing in S106 in FIG. 9 in detail.

The Table data insertion unit 33 selects one unselected record (the top record in the first sequence) from the insertion data table 210 (S301).

The Table data insertion unit 33 generates a hash bit map value, from the target column value that has been registered in the target column name list 90, for the record selected in S301, and registers the hash bit map value in the compared value list (S302).

The Table data insertion unit 33 determines whether there is an unselected record in the insertion data table 210 (S303).

When there is an unselected record (S303: YES), the Table data insertion unit 33 returns to S301 and executes S301 to S303 on the remaining unselected records.

When there is no unselected record (S303: NO), it means that all the records have been registered in the compared target column value list, and thus the Table data insertion unit 33 terminates the processing.

Through the processing in FIG. 9 to FIG. 11 described above, the server 10 checks whether the records in the insertion data table 210 satisfy the unique constraint condition, and then collectively inserts the insertion data table into the Table 3220 as the target. Then, the server 10 registers in the management point management table 500, the start date and time, the end date and time, and the stored position (segment IDs) related to the insertion data table.

Figure 12:
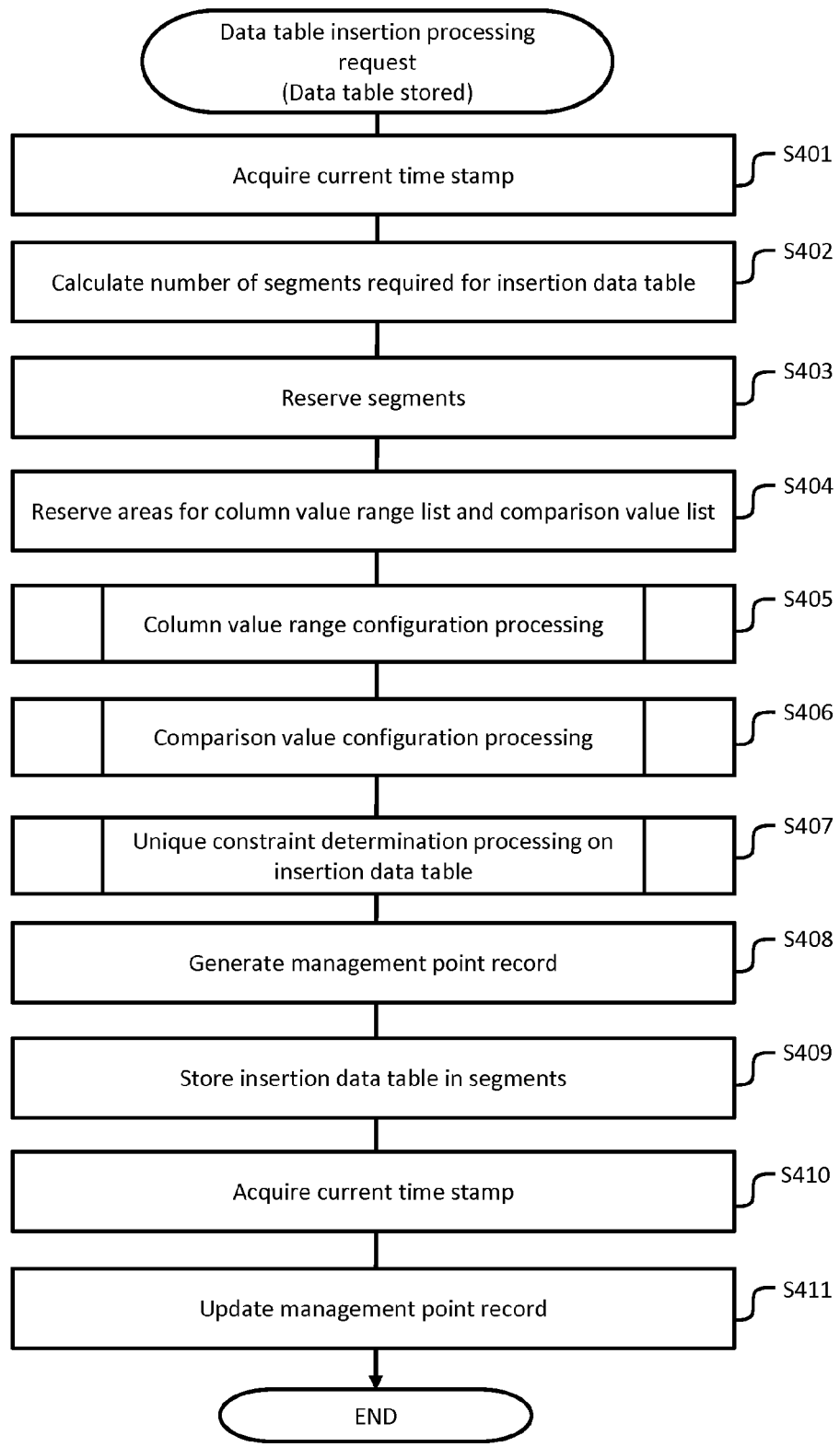
FIG. 12 is a flowchart illustrating an example of the data table insertion processing in the case where the stored data table is stored in the database.

FIG. 12 is a flowchart illustrating an example of the data table insertion processing in the state where a stored data table is in the database 1000. FIG. 12 illustrates the processing in FIG. 3 in detail.

For example, this processing starts when the data operation request reception unit 31 receives the name of table as the insertion target and the name of the insertion data table 210 as the insertion target from the client 11.

Processing in S401 to S406 in FIG. 12 is the same as the processing in S101 to S106 in FIG. 9, and thus the description thereof is omitted.

The Table data insertion unit 33 executes the unique constraint determination processing on the insertion data table 210 (S407). This processing is described in detail later. When the unique constraint condition is satisfied in this unique constraint determination processing, the Table data insertion unit 33 proceeds to the subsequent processing S408.

Processing in S408 to S411 in FIG. 12 is the same as the processing in S107 to S110 in FIG. 9, and thus the description thereof is omitted.

Through the processing described above, the server 10 collectively adds the insertion data table 210 prepared by the administrator to the Table 3220. Furthermore, the server 10 registers in the management point management table 500, the start date and time and the end date and time of the data table insertion processing as information for identifying the record added by the administrator.

When the target column value in the insertion data table 210 matches any one of the target column values in the stored data table, the storing of the insertion data table 210 is cancelled. In other words, the insertion data table 210 is stored when the unique constraint condition is satisfied with respect to the target column values in the stored data table. Thus, the uniqueness of the target column value in the insertion data table 210 can be ensured.

Figure 13:
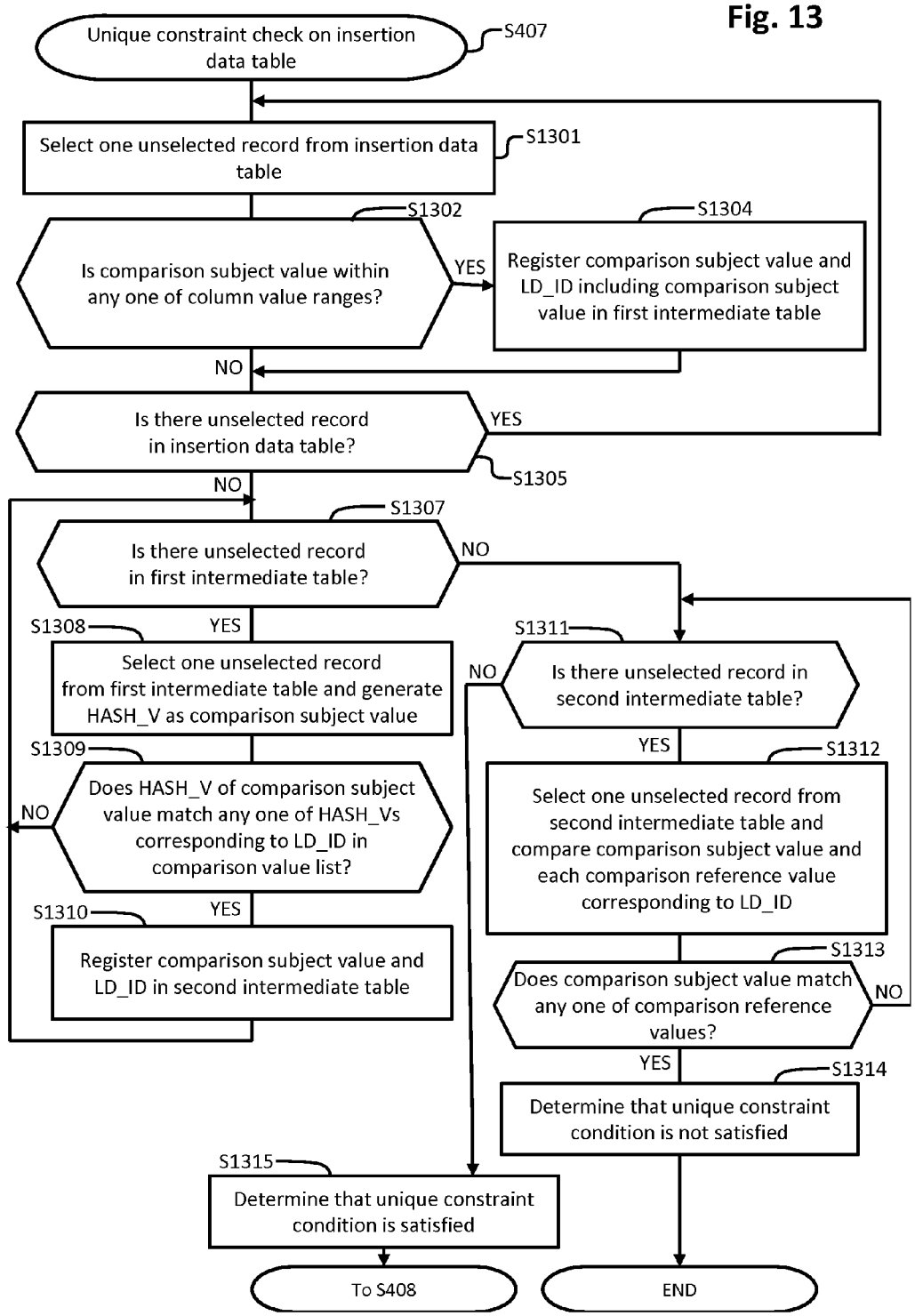
FIG. 13 is a flowchart illustrating an example of unique constraint determination processing on an insertion data table.

FIG. 13 is a flowchart illustrating an example of the unique constraint determination processing on the insertion data table. FIG. 13 illustrates the processing in S407 in FIG. 12 in detail.

The Table data insertion unit 33 selects one unselected record (the top record in the first sequence) from the insertion data table 210 (S1301).

The Table data insertion unit 33 determines whether the target column value (comparison-subject value) corresponding to the target column name list 90 is included in any one of the column value ranges registered in the column value range list 300 (S1302). The Table data insertion unit 33 proceeds to S1305 when the comparison-subject value is included in none of the column value ranges (S1302: NO).

When the comparison-subject value is included in any one of the column value ranges (S1302: YES), the Table data insertion unit 33 registers in the first intermediate data table 800, the comparison-subject value and the LD_ID corresponding to the column value range including the comparison-subject value, and then proceeds to S1305.

The Table data insertion unit 33 determines whether there is an unselected record in the insertion data table 210 (S1305). When there is an unselected record in the insertion data table (S1305: YES), the Table data insertion unit 33 returns to S1301.

When there is no unselected record in the insertion data table (S1305: NO), it means that the determination in S1302 has been completed on all the records in the insertion data table, and thus the Table data insertion unit 33 proceeds to S1307.

The Table data insertion unit 33 determines whether there is an unselected record in the first intermediate table 800 (S1307). First of all, a case where there is an unselected record in the first intermediate table 800 (S1307: YES) will be described.

The Table data insertion unit 33 selects one unselected record from the first intermediate table 800, and generates a hash bit map value (HASH_V) as the compared value from the target column value (comparison-subject value) of the selected record (S1308). The Table data insertion unit 33 identifies the LD_ID corresponding to the selected record and determines whether the HASH_V of the comparison-subject value thereof matches any one of a plurality of HASH_Vs corresponding to the identified LD_ID in the compared target column value list 400 (S1309).

When the HASH_V of the comparison-subject value matches none of a plurality of HASH_Vs corresponding to the identified LD_ID (S1309: NO), the Table data insertion unit 33 returns to S1307.

When the HASH_V of the comparison-subject value matches any one of a plurality of HASH_Vs corresponding to the identified LD_ID (S1309: YES), the Table data insertion unit 33 registers in the second intermediate table 900, the comparison-subject value and the identified LD_ID (S1310), and then returns to S1307.

Next, a case where there is no unselected record in the first intermediate table 800 (S1307: NO) in S1307 will be described.

The Table data insertion unit 33 determines whether there is an unselected record in the second intermediate table 900 (S1311). When there is no unselected record (S1311: NO), it is determined that all the target column values in the insertion data table satisfy the unique constraint condition (S1315), and the processing proceeds to S408 in FIG. 12 (to S408).

When there is an unselected record in the second intermediate table 900 (S1311: YES), the Table data insertion unit 33 selects one unselected record from the second intermediate table 900, and compares the comparison-subject value corresponding to the selected record with a plurality of comparison reference value relating to the LD_ID relating to the selected record (S1312).

The Table data insertion unit 33 determines whether the comparison-subject value matches any one of the plurality of comparison reference values relating to the LD_ID (S1313). When the comparison-subject value matches none of the comparison reference values (S1313: NO), the Table data insertion unit 33 returns to S1311.

When the comparison-subject value matches any one of the comparison reference values (S1313: YES), the Table data insertion unit 33 determines that the unique constraint condition is not satisfied (S1314), and the registration of the insertion data table is cancelled (END).

Figure 15:
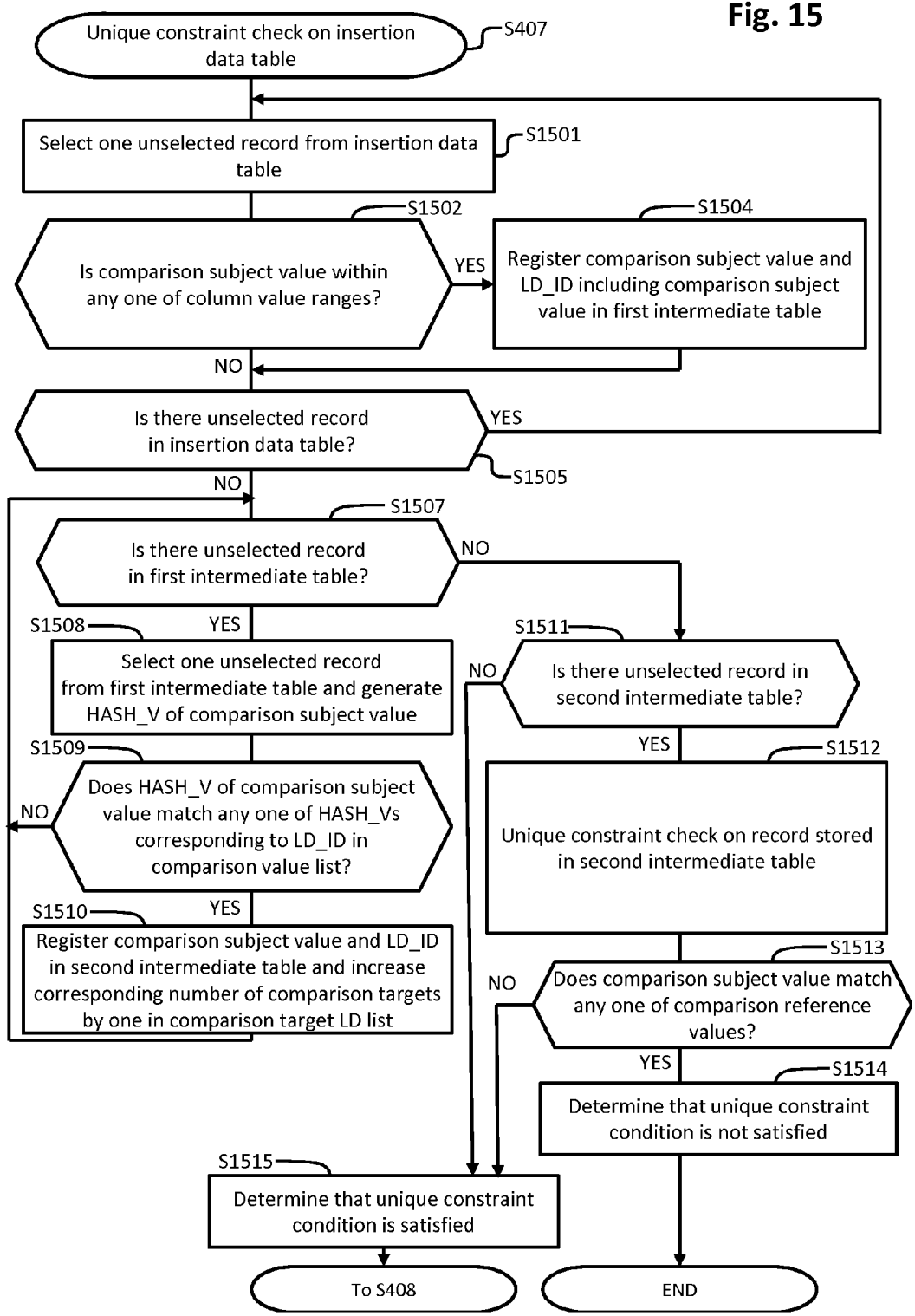
FIG. 15 is a flowchart illustrating an example of the unique constraint determination processing on the insertion data table.

FIG. 15 is a flowchart illustrating an example of the unique constraint determination processing on the insertion data table. FIG. 15 illustrates the processing in S407 in FIG. 12 in detail.

The Table data insertion unit 33 selects one unselected record (the top record in the first sequence) from the insertion data table 210 (S1501).

The Table data insertion unit 33 determines whether the target column value (comparison-subject value) corresponding to the target column name list 90 is included in any one of the column value ranges registered in the column value range list 300 (S1502). When the comparison-subject value is included in none of the column value ranges (S1502: NO), the Table data insertion unit 33 proceeds to S1505.

When the comparison-subject value is included in any one of the column value ranges (S1502: YES), the Table data insertion unit 33 registers in the first intermediate data table 800, the comparison-subject value and the LD_ID corresponding to the column value range including the comparison-subject value, and then proceeds to S1505.

The Table data insertion unit 33 determines whether there is an unselected record in the insertion data table 210 (S1505). When there is an unselected record in the insertion data table (S1505: YES), the Table data insertion unit 33 returns to S1501.

When there is no unselected record in the insertion data table (S1505: NO), it means that the determination in S1502 has been completed on all the records in the insertion data table, and thus the Table data insertion unit 33 proceeds to S1507.

The Table data insertion unit 33 determines whether there is an unselected record in the first intermediate table 800 (S1507). First of all, a case where there is an unselected record in the first intermediate table 800 (S1507: YES) will be described.

The Table data insertion unit 33 selects one unselected record from the first intermediate table 800, and generates a hash bit map value (HASH_V) as the compared value from the target column value (comparison-subject value) of the selected record (S1508). The Table data insertion unit 33 identifies the LD_ID corresponding to the selected record and determines whether the HASH_V of the comparison-subject value thereof matches any one of a plurality of HASH_Vs corresponding to the identified LD_ID in the compared target column value list 400 (S1509).

When HASH_V of the comparison-subject value matches none of a plurality of HASH_Vs corresponding to the identified LD_ID (S1509: NO), the Table data insertion unit 33 returns to S1507.

When HASH_V of the comparison-subject value matches any one of a plurality of HASH_Vs corresponding to the identified LD_ID (S1509: YES), the Table data insertion unit 33 registers in the second intermediate table 900, the comparison-subject value and the identified LD_ID, increments the corresponding number of comparison targets in the comparison target LD list 410 by one (S1510), and then returns to S1507.

Next, a case where there is no unselected record in the first intermediate table 800 (S1507: NO) in S1507 will be described.

The Table data insertion unit 33 determines whether there is an unselected record in the second intermediate table 900 (S1511). When there is no unselected record (S1511: NO), it is determined that all the target column values in the insertion data table satisfy the unique constraint condition (S1515), and the processing proceeds to S408 in FIG. 12 (to S408).

When there is an unselected record in the second intermediate table 900 (S1511: YES), the Table data insertion unit 33 compares the comparison-subject value, corresponding to each record, with a plurality of comparison reference values corresponding to the LD_ID corresponding to the record, and performs comparison on all the records in the second intermediate table 900 (S1512).

The Table data insertion unit 33 determines whether the comparison-subject value matches any one of the plurality of comparison reference values corresponding to the LD_ID (S1513). When the comparison-subject value matches none of the comparison reference value (S1513: NO), the Table data insertion unit 33 returns to S1511.

When the comparison-subject value matches any one of the comparison reference value (S1513: YES), the Table data insertion unit 33 determines that the unique constraint condition is not satisfied (S1514), and the registration of the insertion data table is cancelled (END).

Figure 16:
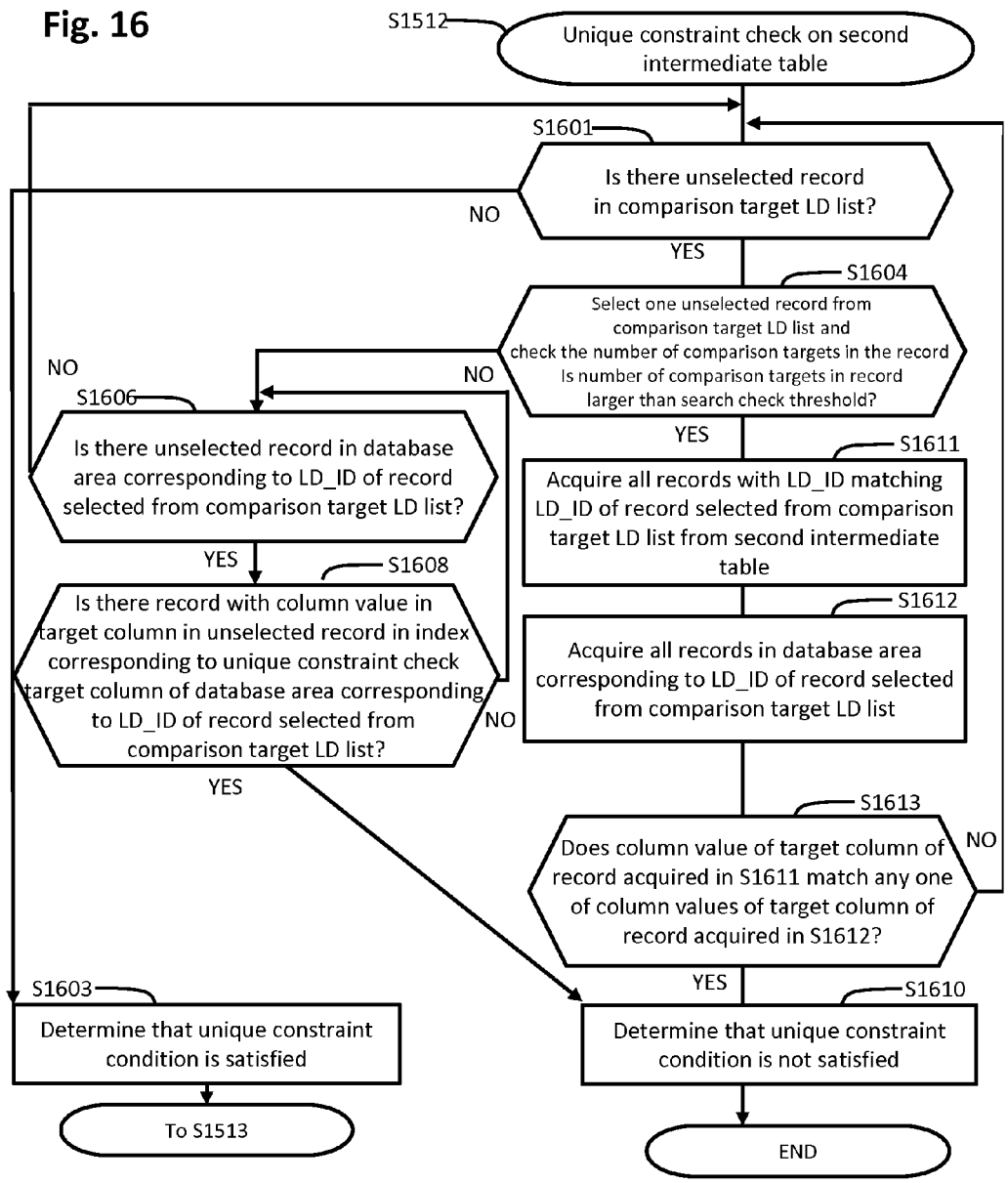
FIG. 16 is a flowchart illustrating an example of the unique constraint determination processing on the insertion data table.

FIG. 16 is a flowchart illustrating an example of the unique constraint determination processing on the insertion data table. FIG. 16 illustrates the processing in S1512 in FIG. 15 in detail.

The Table data insertion unit 33 determines whether there is an unselected record in the comparison target LD list 410 (S1601). When there is no unselected record (S1601: NO), it is determined that all the target column values in the insertion data table satisfy the unique constraint condition (S1603), and the processing proceeds to S1513 in FIG. 15 (to S1513).

When there is an unselected record in the comparison target LD list 410 (S1601: YES), the Table data insertion unit 33 selects one unselected record from the comparison target LD list 410, and performs comparison to determine whether the number of comparison targets 413 in the selected record is larger than a index check threshold 420 (S1604). When the number of comparison targets 413 is equal to or smaller than the index check threshold 420 (S1604: NO), it is determined whether there is an unselected record in the database area corresponding to the LD_ID 411 of the record selected from the comparison target LD list 410 (S1606).

When there is no unselected record (S1606: NO), it is determined that all the column values, compared with the column values in the database area corresponding to the currently checked LD_ID 411, satisfy the unique constraint condition (S1607), and the processing proceeds to S1601. When there is an unselected record (S1606: YES), whether there is a record with a column value in the target column in the unselected record in the index 3230 for a unique constraint check target column of the database area corresponding to the LD_ID 411 of the record selected from the comparison target LD list 410 (S1608). When there is no such record (S1608: NO), the processing proceeds to S1606. When there is the record (S1608: YES), it is determined that the unique constraint condition is not satisfied (S1610), and the registration of the insertion data table is cancelled (END).

When the number of comparison targets 413 is larger than the index check threshold 420 (S1604: YES), all the records with the LD_ID matching the LD_ID 411 of the record, selected from the comparison target LD list 410, are acquired from the second intermediate table 900 (S1611). Next, all the records in the database area corresponding to the LD_ID of the record selected from the comparison target LD list 410 are acquired (S1612). The records acquired in S1610 are collectively compared with the records acquired in S1611, and it is determined whether there is a record with the matching column value for the target column (S1613). When there is no matching record (S1613: NO), the processing proceeds to S1601. When there is a matching record (S1613: YES), it is determined that the unique constraint condition is not satisfied (S1610), and the registration of the insertion data table is cancelled (END).

In the processing described above, the insertion data table not satisfying the unique constraint condition is not stored in the segment. In other words, the insertion data table 210 that satisfies the unique constraint condition with respect to the target column value in the stored data table is stored in the segment. Thus, the uniqueness of the target column value in the insertion data table 210 can be ensured.

The embodiment described above is merely an example for describing the present invention, and thus there is no intention to limit the scope of the present invention to the embodiment only. A person skilled in the art can implement the present invention in various other modes without departing from the gist of the present invention. For example, when there are a plurality of target columns with different types of attributes, the database area may be reserved for each type of the target column. For example, when the target columns of a plurality of types are "ORDER_ID" and "ITEM_ID" in FIG. 3, the insertion data table 210 may be stored in a first database area when the target column "ORDER_ID" of the insertion data table 210 satisfies the unique constraint condition, and may be stored in a second database area when the target column "ITEM_ID" of the insertion data table 210 also satisfies the unique constraint condition. Thus, the same insertion data table 210 may be stored in a plurality of different database areas (including at least one of the column value range list 300, the compared value list 400, the first intermediate table 800, and the second intermediate table 900 for example). Alternatively, the insertion data table 210 may be stored in a common database even when each of the target columns of a plurality of types satisfies the unique constraint condition.

REFERENCE SIGNS LIST

10 Server
11 Client server
12 External storage apparatus

The invention claimed is:

1. A database management system that reduces processing costs for ensuring uniqueness of a target column in a database, the system comprising:
    an external storage system that stores the database that includes a plurality of data tables;
    a server that includes:
    a network interface communicatively coupled to the external storage system,
    a memory that stores comparison reference values, and
    a processor communicatively coupled to the network interface and the memory;
    wherein the processor of the server:
    receives, using the network interface, a new data table input to the database of the external storage system;
    executes unique constraint determination processing to generate a unique constraint, wherein the unique constraint determination processing includes first stage determination processing and second stage determination processing that is executed when a first determination result obtained in the first stage determination processing is true; and
    stores a record from the new data table in the database using the unique constraint in the target column;
    wherein:
    the first stage determination processing includes determining the first determination result that indicates whether any of comparison-subject values in the new data table is included in a column value range in a stored data table of the database, the column value range having maximum and minimum values respectively corresponding to maximum and minimum values of the comparison reference values,
    the second stage determination processing includes determining a second determination result that indicates whether all in-range comparison-subject values in the new data table are different from all the comparison reference values, the in-range comparison-subject value being the comparison-subject values included in the column value range, and
    when the second determination result is true, the processor stores the new data table in a second database area different from a first database area storing the stored data table in the database.

2. The database management system according to claim 1, wherein
    the first stage determination processing is executed by using first determination information that indicates the column value range of each of the plurality of data tables, and
    the processor of the server further:
    registers in the first determination information, the column value range of the new data table to be stored in the second database area.

3. The database management system according to claim 1, wherein the second stage determination processing is processing of determining whether all comparison subject reduced values, each obtained by reducing an information amount corresponding respectively to all in-range comparison-subject values in the new data table, are different from all comparison reference reduced values each obtained by reducing an information amount corresponding respectively to all the comparison reference values in the stored data table.

4. The database management system according to claim 3, wherein
the second stage determination processing is executed by using second determination information that includes a comparison reduced value corresponding to the comparison reference value in the stored data table, and
the processor of the server further registers the comparison subject reduced values corresponding to an in-the-range comparison-subject values in the new data table to be stored in the second database area.

5. The database management system according to claim 3, wherein
each of the comparison subject reduced values is a predetermined N highest order bits (N being an integer equal to or larger than 2) of a value as a binary representation of the comparison-subject value, and
the comparison reference reduced value is the predetermined N highest order bits of a value as a binary representation of the comparison reference value.

6. The database management system according to claim 3, wherein,
each of the comparison subject reduced values is a hash value of the comparison-subject value, and
each of the comparison reference reduced values is a hash value of the comparison reference value.

7. The database management system according to claim 1, wherein
the unique constraint determination processing includes third stage determination processing in addition to the first stage determination processing and the second stage determination processing, and
in the third stage determination processing, with a number of column values from which true is obtained as the determination result obtained in the second stage determination processing and a database area corresponding to the column value, reading all tables storing a record including a determination target column value and checking whether the determination target column value matches each comparison-subject value or reading an index indicating a determination target column value and checking whether the determination target column value matches each comparison-subject value is selected.

8. The database management system according to claim 1, wherein
the unique constraint determination processing includes third stage determination processing in addition to the first stage determination processing and the second stage determination processing, and
in the third stage determination processing, with a number of column values from which true is obtained as the determination result obtained by the second stage determination processing and a database area corresponding to the column value, reading all tables storing a record including a determination target column value and checking whether the determination target column value matches each comparison-subject value or reading an index indicating a determination target column value and checking whether the determination target column value matches each comparison-subject value is selected for each database area to be checked.

9. A computer that reduces processing costs for ensuring uniqueness of a target column in a database, the computer comprising:
a network interface communicatively coupled to an external storage system, wherein the external storage system stores the database that includes a plurality of data tables;
a memory that stores comparison reference values; and
a processor communicatively coupled to the network interface and the memory;
wherein the processor:
receives, using the network interface, a new data table input to the database of the external storage system;
executes unique constraint determination processing to generate a unique constrain, wherein the unique constraint determination processing includes first stage determination processing and second stage determination processing that is executed when a first determination result obtained in the first stage determination processing is true; and
stores, using the network interface, a record from the new data table in the database using the unique constraint in the target column;
wherein:
the first stage determination processing includes determining the first determination result that indicates whether any of comparison-subject values in the new data table is included in a column value range in a stored data table of the database, the column value range having maximum and minimum values respectively corresponding to maximum and minimum values of the comparison reference values,
the second stage determination processing includes determining a second determination result that indicates whether all in-range comparison-subject values in the new data table are different from all the comparison reference values, the in-range comparison-subject value being the comparison-subject values included in the column value range, and
when the second determination result is true, the processor stores the new data table in a second database area different from a first database area storing the stored data table in the database when a determination result obtained in the unique constraint determination processing is true.

10. The computer according to claim 9, wherein
the first stage determination processing is executed by using first determination information that indicates the column value range of each of the plurality of data tables, and
the processor further registers in the first determination information, the column value range of the new data table to be stored in the second database area.

11. The computer according to claim 9, wherein the second stage determination processing is processing of determining whether all comparison subject reduced values, each obtained by reducing an information amount corresponding respectively to all in-range comparison-subject values in the new data table, are different from all comparison reference reduced values each obtained by reducing an information amount corresponding respectively all the comparison reference values in the stored data table.

12. The computer according to claim 9, wherein
the second stage determination processing is executed by using second determination information that includes a comparison reduced value corresponding to the comparison reference value in the stored data table, and the processor further registers the comparison subject reduced values corresponding to an in-the-range comparison-subject values in the new data table to be stored in the second database area.

13. The computer according to claim 12, wherein
each of the comparison subject reduced values is a predetermined N highest order bits (N being an integer equal to or larger than 2) of a value as a binary representation of the comparison-subject value, and
the comparison reference reduced value is the predetermined N highest order bits of a value as a binary representation of the comparison reference value.

14. The computer according to claim 12, wherein,
each of the comparison subject reduced values is a hash value of the comparison-subject value, and
each of the comparison reference reduced values is a hash value of the comparison reference value.

15. A database management method that reduces processing costs for ensuring uniqueness of a target column in a database, the method comprising:
receiving, by a processor of a server, a new data table input to the database of an external system, wherein the external system is communicatively coupled to the server via a network and the database includes a plurality of data tables;
executing, by the processor of the server, unique constraint determination processing to generate a unique constraint, wherein the unique constrain processing includes first stage determination processing and second stage determination processing that is executed when a first determination result obtained in the first stage determination processing is true;
wherein:
the first stage determination processing includes determining the first determination result that indicates whether any of comparison-subject values in the new data table is included in a column value range in a stored data table of the database, the column value range having maximum and minimum values respectively corresponding to maximum and minimum values of comparison reference values that are stored in a memory of the server,
the second stage determination processing includes determining a second determination result that indicates whether all in-range comparison-subject values in the new data table are different from all the comparison reference values, the in-range comparison-subject value being the comparison-subject values included in the column value range, and
when the second determination result is true, the processor stores the stored data table in the database when a determination result obtained in the unique constraint determination processing is true.

* * * * *